United States Patent [19]
Takeuchi

[11] Patent Number: 6,040,972
[45] Date of Patent: *Mar. 21, 2000

[54] PROTECTION DEVICE FOR COMMUNICATION

[75] Inventor: Haruyuki Takeuchi, Ishikawa-ken, Japan

[73] Assignee: Murata Manufacturing Co., Ltd., Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/948,862

[22] Filed: Oct. 10, 1997

[30] Foreign Application Priority Data

Oct. 22, 1996 [JP] Japan .................................. 8-279073

[51] Int. Cl.$^7$ ...................................................... H02H 3/22
[52] U.S. Cl. ............................................. 361/119; 361/106
[58] Field of Search ................................... 361/119, 106, 361/117–118, 58, 91, 111, 56, 124, 126–127; 379/412; 338/22 R

[56] References Cited

U.S. PATENT DOCUMENTS

| | | | |
|---|---|---|---|
| 4,467,310 | 8/1984 | Jakab | 338/22 R |
| 4,661,979 | 4/1987 | Jakab | 379/412 |
| 4,695,916 | 9/1987 | Satoh et al. | 361/56 |
| 4,878,038 | 10/1989 | Tsai | 337/107 |
| 4,964,160 | 10/1990 | Traube et al. | 379/412 |
| 5,057,964 | 10/1991 | Bender et al. | 361/118 |
| 5,146,384 | 9/1992 | Markovic et al. | 361/55 |
| 5,198,794 | 3/1993 | Sato et al. | 338/195 |
| 5,198,957 | 3/1993 | Welty et al. | 361/18 |
| 5,204,799 | 4/1993 | Stibila | 361/104 |

*Primary Examiner*—Michael J. Sherry
*Attorney, Agent, or Firm*—Majestic, Parsons, Siebert & Hsue P.C.

[57] ABSTRACT

A protection device for a communication system is inserted between a circuit side and a subscriber side and includes a protection circuit part and trimmable resistors. The protection circuit part includes a tip line and a ring line each extending between an input terminal and an output terminal. The tip line and the ring line each contain at least one thermistor with positive temperature characteristic or one protection resistor as overcurrent-protecting element. The output terminals of the tip line and the ring lines are connected, say, by a diode bridge of which one terminal is grounded and another terminal connected to a power source. Trimmable resistors are each connected to a corresponding one of the output terminals of the protection circuit part and are adapted to be trimmed such that impedance imbalance between the tip and ring lines can be reduced.

19 Claims, 4 Drawing Sheets

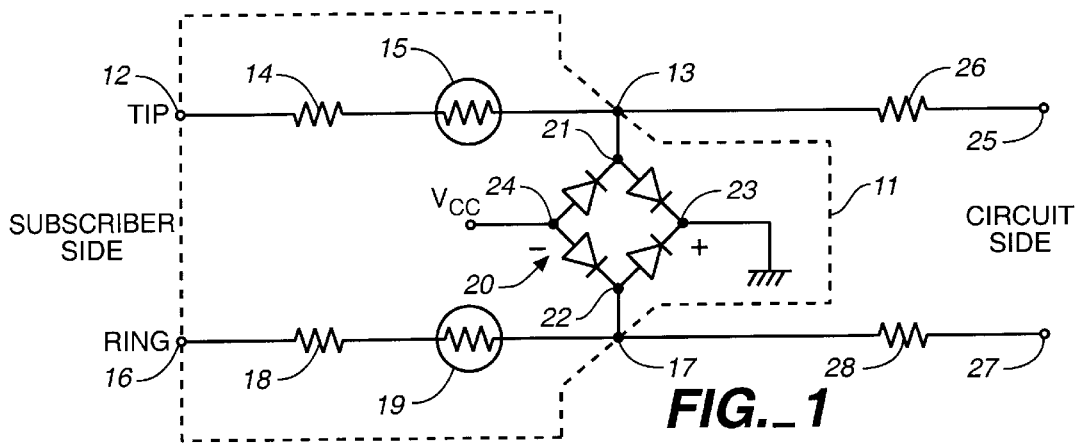
FIG._1
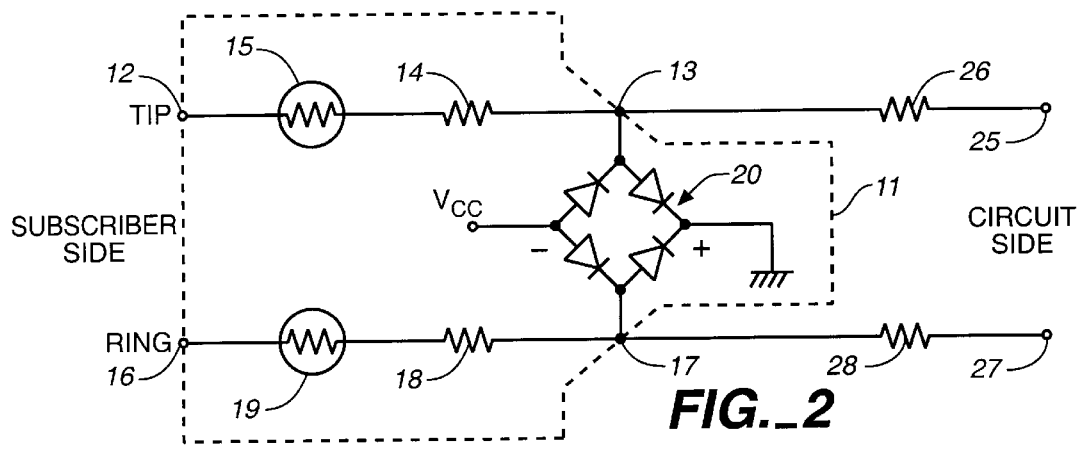
FIG._2
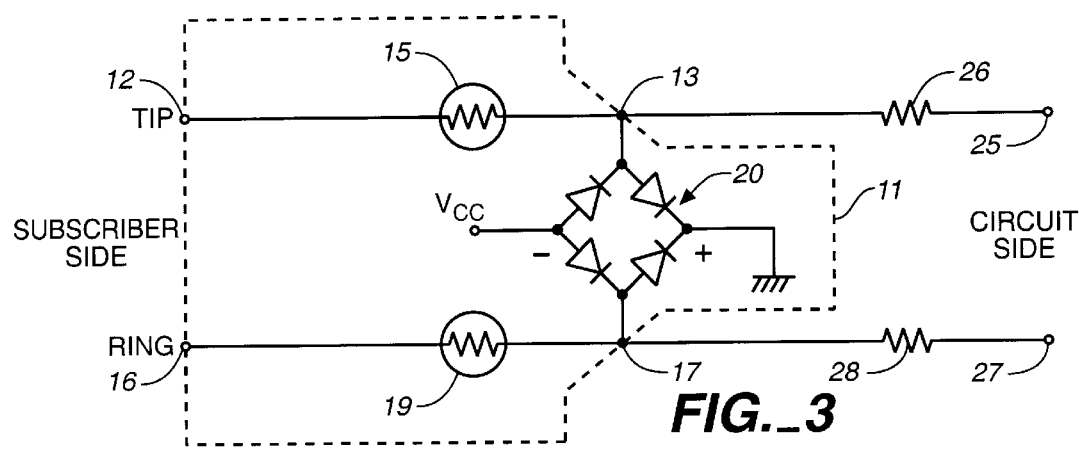
FIG._3

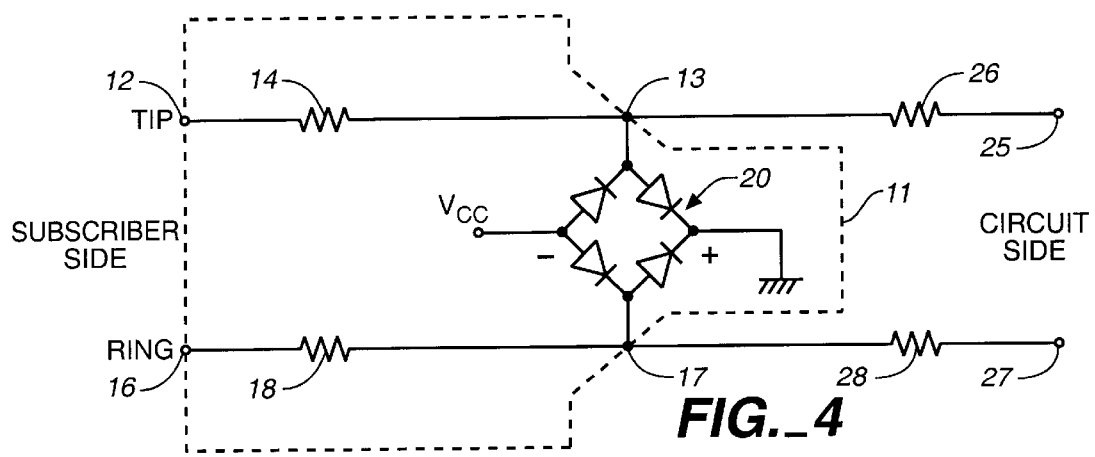
FIG._4
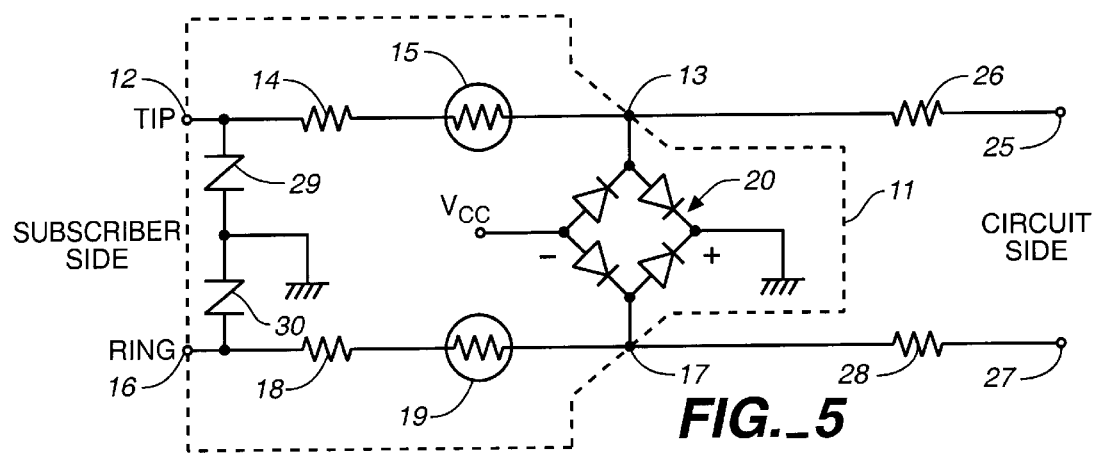
FIG._5
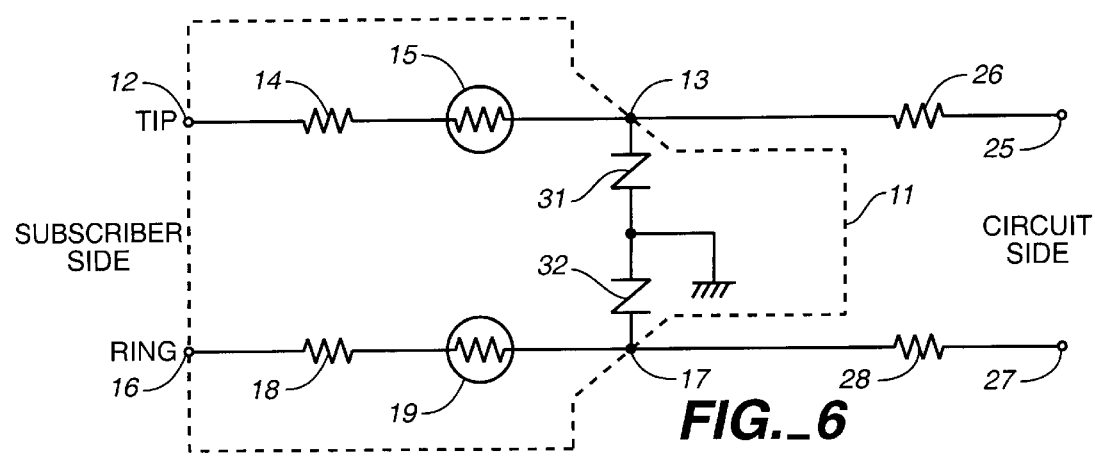
FIG._6

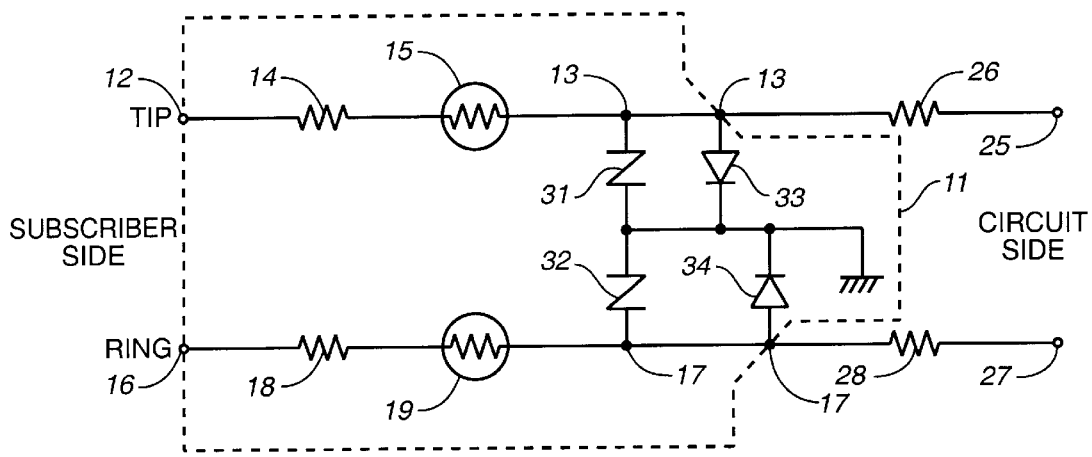
FIG._7
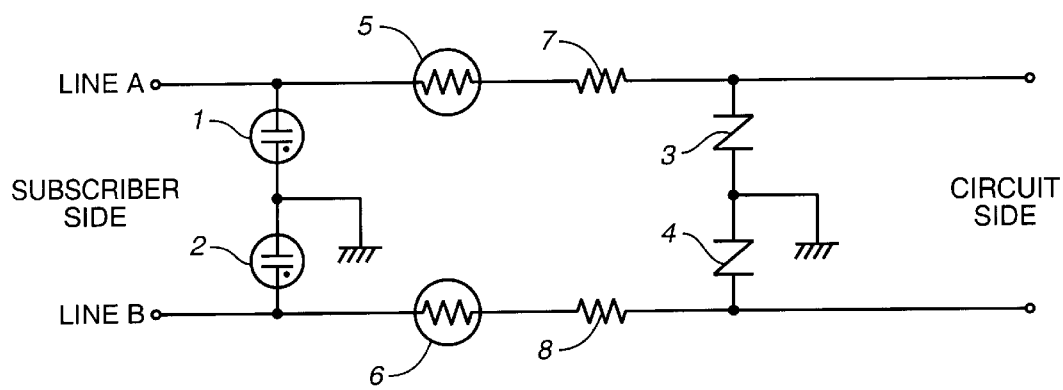
FIG._9
*(PRIOR ART)*

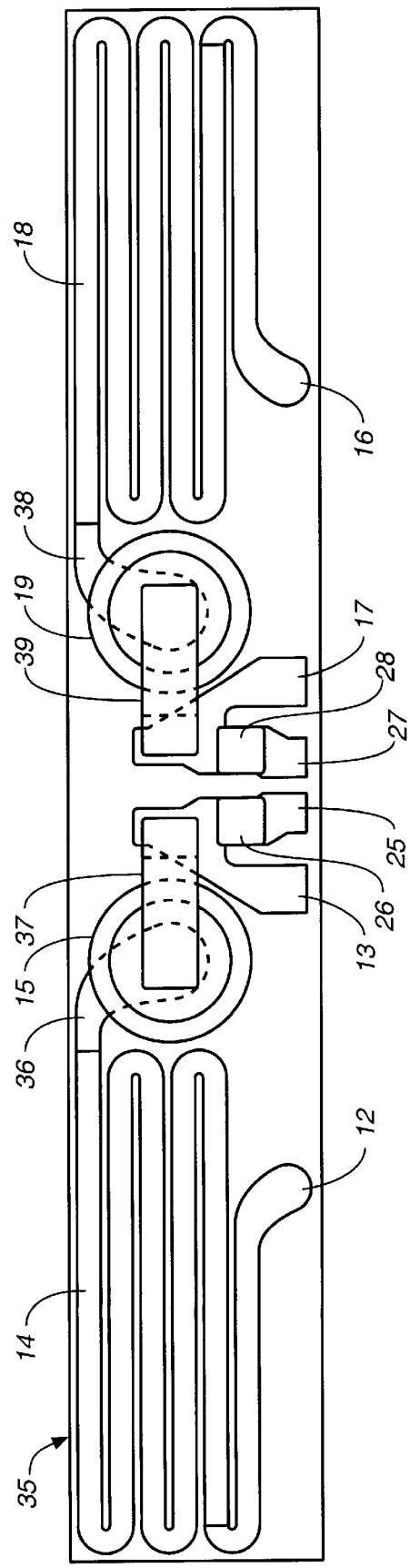

PROTECTION DEVICE FOR COMMUNICATION

BACKGROUND OF THE INVENTION

This invention relates to a protect network device (hereinafter referred to as "protection device") for use in a communication system adapted to be provided in a communication interface between the subscriber side such as telephone lines and an apparatus to be protected (hereinafter referred to as "the subscriber line interface circuit" or simply as "the circuit side") such that the latter can be protected against an abnormally large voltage or current caused, for example, by lightning or contact with a power line. In particular, this invention relates to such a protection device which uses at least a thermistor with positive temperature characteristic (hereinafter referred to as a PTC thermistor) or a resistor.

Japanese Patent Publication Tokko 3-5135 disclosed a protection device for a communication system which includes a protection circuit illustrated in FIG. 9 and is currently in use as a communication safety device. This protection circuit is characterized as having arresters 1 and 2 which are connected to each other in series and between the input terminals on the subscriber side of lines A and B, a connecting point therebetween being grounded. A series connection of two varistors 3 and 4 is connected between the lines A and B of the output terminal on the side of the subscriber line interface circuit, or the circuit side, a connecting point therebetween being also grounded. A series connection of a PTC thermistor 5 and a thick-film resistor 7 is connected to the line A, and another series connection of another PTC thermistor 6 and another thick-film resistor 8 is connected to the line B between the arresters 1 and 2 and the varistors 3 and 4 as shown.

In this protection circuit, the PTC thermistors 5 and 6 and the thick-film resistors 7 and 8 are each adapted to function as a protective element against overcurrent, but the PTC thermistors 5 and 6, in particular, have the disadvantage when used for this purpose in that their resistance values have large deviations. For this reason, the thick-film resistors 7 and 8 are adapted to be trimmed such that the impedance imbalance between the lines A and B can be reduced by controlling the resistance values of the series connections of the PTC thermistors 5 and 6 and the thick-film resistors 7 and 8 to the level of accuracy of about ±1%.

With a protection device thus formed, a surge by lightning entering the communication lines is absorbed by the arresters 1 and 2 at the first stage. A lightning surge which failed to be absorbed by the arresters 1 and 2 will pass through the thermistors 5 and 6, flowing into the resistors 7 and 8 as overcurrent and to the ground through the varistors 3 and 4. In the case of an abnormally large voltage or current due, for example, to a contact with a power line, the thermistors 5 and 6 react to it and cut the current after a specified length of time has elapsed. Until the current is cut, however, the overcurrent passes through the thermistors 5 and 6 to flow into the resistors 7 and 8, escaping to the ground through the varistors 3 and 4.

With a protection device thus structured, thick-film resistors 7 and 8 with a relatively large allowable loss must be used because, as described above, there is a possibility of an overcurrent flowing into them. This means that fairly large resistors must be used, and that their anti-surge capability must be kept in mind when they are trimmed. If the trimming is effected by a straight cut, as usually done, the allowable power of surge which can be resisted by a thick-film resistor which has not been trimmed is 5 to 20 times greater than by a trimmed thick-film resistor, although it varies, depending upon the resistor material and the depth of the cut.

SUMMARY OF THE INVENTION

It is therefore an object of this invention to provide an improved protection device for a communication system with which impedance balancing can be easily and accurately effected without adversely affecting the anti-surge characteristics of the thick-film resistors contained in its protection circuit of the type described above. A protection device embodying this invention, with which the above and other objects can be accomplished, may be characterized not only as including a protection circuit which contains at least a PTC thermistor or a resistor which is primarily for the protection (hereinafter referred to as "the protection resistor") as an overcurrent-resistant element between the circuit side and the subscriber side, but also as including resistors adapted to be trimmed (hereinafter referred to as "the trimmable resistors", aside from the protection resistor, each connected to an associated one of terminals of the protection circuit on the circuit side. These trimmable resistors are adapted to be trimmed such that the resistance value of the series connection of the trimmable resistor and the protection circuit can be adjusted to a specified value.

With a protection device thus structured, a surge current or an overcurrent caused, for example, by lightning or a contact with a power line will pass through the protection circuit which contains at least a PTC thermistor or a protection resistor, but the inter-line impedance balance (longitudinal balance) of the protection circuit can be adjusted by trimming the trimmable resistors which are provided aside from the protection resistor.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a circuit diagram of a protection device according to a first embodiment of this invention;

FIG. 2 is a circuit diagram of another protection device according to a second embodiment of this invention;

FIG. 3 is a circuit diagram of still another protection device according to a third embodiment of this invention;

FIG. 4 is a circuit diagram of still another protection device according to a fourth embodiment of this invention;

FIG. 5 is a circuit diagram of still another protection device according to a fifth embodiment of this invention;

FIG. 6 is a circuit diagram of still another protection device according to a sixth embodiment of this invention;

FIG. 7 is a circuit diagram of still another protection device according to a seventh embodiment of this invention;

FIG. 8 is a plan view of a substrate for the protection device of FIG. 1; and

FIG. 9 is a circuit diagram of a prior art protection device.

Throughout herein, like components are indicated by the same numerals even if they are components of different protection devices according to different embodiments of this invention and may not always be explained repetitively.

DETAILED DESCRIPTION OF THE INVENTION

As shown in FIG. 1, a protection device according to a first embodiment of this invention has a protection circuit part 11 with a thick-film protection resistor 14 and a PTC thermistor 15 serving as overcurrent-protecting elements connected in series between terminal 12 of the tip line on the subscriber side and terminal 13 on the side of the apparatus to be protected (or "the circuit side"), and similarly another thick-film protection resistor 18 and another PTC thermistor 19 serving as overcurrent-protecting elements connected in series between terminal 16 of the ring line of the protection circuit part 11 on the subscriber side and terminal 17 on the circuit side. There is also a diode bridge 20 with its AC input terminals 21 and 22 connected respectively to the terminals 13 and 17. The plus terminal 23 of the diode bridge 20 is grounded, and its negative terminal 24 is connected to a power source $V_{CC}$ (of about −48V in the case of a switchboard). This diode bridge 20 thus serves to cause an overcurrent to pass either to the ground or to the power source $V_{CC}$.

There is a trimmable thick-film resistor 26 connected in series with the thick-film protection resistor 14 and the PTC thermistor 15 on the side of the tip line between the terminal 13 of the protection circuit part 11 on the circuit side and the output terminal 25 on the circuit side of the protection device as a whole. On the side of the ring line, there is similarly another trimmable thick-film resistor 28 connected in series with the thick-film protection resistor 18 and the PTC thermistor 19 between the terminal 17 on the circuit side of the protection circuit part 11 and the output terminal 27 on the circuit side of the protection device as a whole. These two trimmable thick-film resistors 26 and 28 are for being trimmed such that the resistance values of the series connection of the thick-film protection resistor 14, the PTC thermistor 15 and the trimmable resistor 26 and the series connection of the protection thick-film resistor 18, the PTC thermistor 19 and the trimmable resistor 28 will each attain a specified value and hence that an impedance balance can be obtained between the tip line and the ring line. An ordinary method of trimming by a straight cut may be used for this purpose.

The PTC thermistors 15 and 19 are selected according to the voltage resistance and current resistance values required of them at the time of an accidental contact with a power line, but those with voltage resistance 70V–600V and maximum current 1 A–10 A may be used. Characteristics of the thick-film protection resistors 14 and 18 are determined according to the waveform of the surge and the current to be applied but those with allowable power in the range of 1 W–10 W are selected commonly. The diodes in the diode bridge 20 are also selected in terms of the maximum current, as was the case with the thermistors 15 and 19, but those with maximum constant current 1 A–2 A and voltage 1V–2V in the forward direction and having a small size are preferred.

The size of each of the trimmable thick-film resistors 26 and 28 is determined by their resistance value and maximum line current. If the maximum line current is about 120 mA and the resistance value is 27 Ω, the allowable loss of each of these resistors 26 and 28 is 0.39 W.

If a power line accidentally touches the tip line and ring line of such a protection device, an overcurrent will flow into the PTC thermistors 15 and 19 through the thick-film protection resistors 14 and 18, causing the PTC thermistors 15 and 19 to heat up and increase their resistance values quickly. The overcurrent is thus controlled, and the apparatus to be protected, such as a switchboard, is protected. The apparatus to be protected such as a switchboard is further protected by the diode bridge 20 clamped to the ground voltage and to the source $V_{CC}$ from a surge current caused in a communication line, for example, by lightning which will not activate the PTC thermistors 15 and 19 or an overcurrent which passes through during a short period of time before the PTC thermistors 15 and 19 are activated.

Not only the apparatus intended to be protected by the protection device as described above, but also the trimmable thick-film resistors 26 and 28 are always protected from an excessive current and an excessive voltage. Accordingly, the impedance balance between the tip line (between terminals 12 and 25) and the ring line (between terminals 16 and 27) is not affected because of these trimmable resistors 26 and 28. This further implies that the quality of communication, for example, of a switchboard is not adversely affected and hence that the useful lifetime of such a protection device for communication can be extended.

The trimmable resistors 26 and 28 in the protection device for communication shown in FIG. 1 may serve to be trimmed, for example, for matching line impedance between the two lines between a telephone terminal and a subscriber line interface circuit such that the resistance value of each is adjusted. Such trimmable resistors 26 and 28 may be disposed on a substrate for a communication safety device together with the protection circuit part 11 comprising the thick-film protection resistors 14 and 18 and the PTC thermistors 15 and 19 or may be provided as a separate unit to be later connected to the protection circuit part 11, say, of a prior art communication safety device.

Other protection devices embodying this invention may be formed as variations of the device described above with reference to FIG. 1. FIG. 2 shows one such example obtained by interchanging the positions of the thick-film protection resistors 14 and 18 with those of the PTC thermistors 15 and 19. FIGS. 3 and 4 show that either the thick-film protection resistors 14 and 18 or the PTC thermistors 15 and 19, all serving as overcurrent-protecting elements, may be dispensed with.

Although no arresters are shown in any of the examples illustrated above but arresters may be connected to the front stage on the subscriber side. Even without such arresters, however, protection is possible against lightning surge on the order of 10 μsec×1000 μsec, 1 kV, 100 A. If front-stage arresters 29 and 30 are connected as shown in FIG. 5, small-sized, small-capacity arresters may suffice for the purpose.

Instead of the diode bridge 20 as shown in FIGS. 1–5, use may be made, as shown in FIGS. 6 and 7, of bi-directional silicon surge absorbers 31 and 32 which function at voltages in excess of the source voltage and have a low terminal voltage of 1V–2V at the time of operation. The two surge absorbers 31 and 32 are connected to each other in series between the terminals 13 and 17. The junction between the surge absorbers 31 and 32 is grounded. In the embodiment shown in FIG. 7, diodes 33 and 34 are further connected in parallel respectively with the surge absorbers 31 and 32.

FIG. 8 shows an example of substrate 35 for a protection device of this invention such as the one shown in FIG. 1. Since it is symmetrically structured, only its left-hand side (as seen in FIG. 8) will be described along the path from the input terminal 12 on the subscriber side to the output terminal 25 on the circuit side.

The input terminal 12 is connected to one end of an elongated, curving thick-film protection resistor 14, of which the other end is connected to an electrically conductive land 36 for making electrical connections. The PTC thermistor 15 is disposed on this conductive land 36, its electrode on its bottom side being connected to the conductive land 36. The electrode on the upper surface of the PTC thermistor 15 is connected to one end of an electrically conductive plate 37 for making electrical connections. The other end of this conductive plate 37 is connected to the terminal 13 to which is connected the diode bridge 20 (not shown in FIG. 8). One end of the trimmable thick-film resistor 26 is also connected to the terminal 13 and the other end of this trimmable thick-film resistor 26 is connected to the output terminal 25.

The circuit on the side of the chip line of the protection device of FIG. 1 is thus formed. The circuit on the side of the ring line is formed on the right-hand side (as seen in FIG. 8). Numerals 38 and 39 respectively indicate an electrically conductive land and an electrically conductive plate which correspond respectively to the conductive land 36 and the conductive plate 37. As explained above, the trimmable thick-film resistors 26 and 28 may alternatively be formed on another substrate different from the substrate 35 shown in FIG. 8 and later connected to the components formed on the substrate 35.

In summary, trimmable resistors are provided independently of thick-film protection resistors which may be included in the protection circuit part, and these trimmable resistors may be trimmed so as to improve the impedance balance of the lines in view of the fluctuations in the resistance values of overcurrent-protecting elements such as PTC thermistors and protection resistors. In other words, there is no need to trim any of the thick-film protection resistors which may be included in the protection circuit part. As a result, the surge-resisting capability of the protection resistors need not be compromised. Moreover, since the trimmable resistors are not expected to function as an overcurrent-protecting element, resistors with small allowable power may be used for the purpose. Thus, they may be small and they can be trimmed without regard to the effect of trimming on its surge-resisting capability.

What is claimed is:

1. A protection device for a communication system having a subscriber side and a circuit side adjacent each other, said protection device comprising:

protection circuit part entirely within said subscriber side serving to protect protection-requiring devices within said circuit side against an abnormal electrical condition occurring inside said subscriber side, said protection circuit including overcurrent-protecting elements, said overcurrent-protecting elements including at least thermistors having positive temperature characteristic or protection resistors; and trimmable resistors which are within said circuit side and are connected between said protection circuit part and said protection-requiring devices for being trimmed such that resistance values of series connections of said trimmable resistors and said overcurrent-protecting elements can be changed to specified values.

2. A protection device for a communication system having a subscriber side and a circuit side adjacent each other, said protection device comprising:

a protection circuit part entirely within said subscriber side serving to protect protection-requiring devices within said circuit side against an abnormal electrical condition occurring inside said subscriber side, said protection circuit including a tip line and a ring line each containing one or more overcurrent-protecting elements selected from the group consisting of thermistors with positive temperature characteristic and protection resistors, said protection circuit part further including grounded means connected between said tip line and said ring line and connected to ground, for causing a surge current to escape therethrough to the ground; and trimmable resistors which are within said circuit side and are connected between said protection circuit part and said protection-requiring devices for being trimmed such that resistance values of the series connections each formed with one of said trimmable resistors and the at least one overcurrent-protecting element in the corresponding one of said tip line and said ring line can be individually adjusted to a specified resistance value.

3. The protection device of claim 2 wherein said tip line and said ring line each contain one of said thermistors with positive temperature characteristic.

4. The protection device of claim 2 wherein said tip line and said ring line each contain one of said protection resistors.

5. The protection device of claim 2 wherein said tip line and said ring line each contain one of said thermistors with positive temperature characteristic and one of said protection resistors.

6. The protection device of claim 2 wherein said grounded means comprises a diode bridge which has AC input terminals individually connected to said tip line and said ring line, a plus terminal which is grounded and a negative terminal connected to a power source, said grounded means serving to cause a surge current to escape therethrough either to ground or to said power source.

7. The protection device of claim 3 wherein said grounded means comprises a diode bridge which has AC input terminals individually connected to the output terminals of said tip line and said ring line, a plus terminal which is grounded and a negative terminal connected to a power source, said grounded means serving to cause a surge current to escape therethrough either to ground or to said power source.

8. The protection device of claim 4 wherein said grounded means comprises a diode bridge which has AC input terminals individually connected to the output terminals of said tip line and said ring line, a plus terminal which is grounded and a negative terminal connected to a power source, said grounded means serving to cause a surge current to escape therethrough either to ground or to said power source.

9. The protection device of claim 5 wherein said grounded means comprises a diode bridge which has AC input terminals individually connected to the output terminals of said tip line and said ring line, a plus terminal which is grounded and a negative terminal connected to a power source, said grounded means serving to cause a surge current to escape therethrough either to ground or to said power source.

10. The protection device of claim 2 wherein said thermistors with positive temperature characteristic have voltage resistance in the range of 70V–600V and maximum allowed current in the range of 1 A and 10 A.

11. The protection device of claim 2 wherein said protection resistors have allowable power loss in the range of 1 W to 10 W.

12. The protection device of claim 2 wherein said grounded means comprises bidirectional surge absorbers connected in series, a junction therebetween being grounded.

13. The protection device of claim 5 wherein said grounded means comprises bidirectional surge absorbers connected in series, a junction therebetween being grounded.

14. The protection device of claim 5 wherein said protection circuit part further includes bidirectional surge absorbers connected in series between said tip line and said ring line, a junction point between said bidirectional surge absorbers being grounded.

15. The protection device of claim 3 wherein said grounded means comprises bidirectional surge absorbers connected in series, a junction therebetween being grounded.

16. The protection device of claim 4 wherein said grounded means comprises bidirectional surge absorbers connected in series, a junction therebetween being grounded.

17. The protection device of claim 2 wherein said protection circuit part further includes bidirectional surge absorbers connected in series between said tip line and said ring line, a junction point therebetween being grounded.

18. The protection device of claim 3 wherein said protection circuit part further includes bidirectional surge absorbers connected in series between said tip line and said ring line, a junction point therebetween being grounded.

19. The protection device of claim 4 wherein said protection circuit part further includes bidirectional surge absorbers connected in series between said tip line and said ring line, a junction point therebetween being grounded.

* * * * *